Patented Nov. 26, 1946

2,411,807

UNITED STATES PATENT OFFICE 2,411,807

REMOVING SODIUM FROM ALUMINA

August H. Riesmeyer, Collinsville, Ill., assignor to Aluminum Company of America, Pittsburgh, Pa., a corporation of Pennsylvania No Drawing. Application May 24, 1945, Serial No. 595,651

7 Claims. (Cl. 23—143)

This invention relates to the removal of impurities from aluminous material, and relates particularly to the removal of alkali metal compounds from alumina. This application is a continuation-in-part of my copending application Serial No. 522,837, filed February 17, 1944.

Alumina frequently contains a small amount of a sodium compound or compounds, usually referred to and expressed as soda ($Na_2O$), as a result of the alumina having been precipitated from a solution containing a dissolved sodium compound. For example, alumina is principally produced in this country by precipitating aluminum hydrate from a sodium aluminate solution by auto-precipitation, and then calcining the aluminum hydrate. The precipitated aluminum hydrate contains a small amount of soda from the sodium aluminate solution, and although much of the soda can be removed by washing the hydrate, or the alumina produced therefrom, with water, even repeated and lengthy washing fails to remove all of the soda present. Consequently, the alumina usually contains about 0.5 to 0.7 per cent by weight of soda.

Aluminum hydrate can also be precipitated from sodium aluminate solutions by well known methods other than auto-precipitation as by adding carbon dioxide, sodium bicarbonate, or an acid to the solution, and the precipitate produced contains soda. Also, as is well known, hydrous alumina can be precipitated from solutions of aluminum salts such as aluminum chloride or aluminum sulphate, by introducing caustic soda, sodium carbonate, or sodium bicarbonate into the solution, and such alumina contains soda which is difficult to remove completely. Some of the soda can be washed out with water before or after heating the alumina to drive off part or all of the water content thereof, but even after extended washing part of the soda still remains in the alumina.

The presence of the soda is objectionable in a number of uses for alumina, such as the manufacture of certain refractory or ceramic articles, and various processes in which alumina is used as a catalyst or as an auxiliary catalyst or catalyst support. Various methods for removing soda from alumina have been proposed, including treatments involving washing alumina or aluminum hydrate with acid, but such methods have been subject to the objections that they are only partially effective or are expensive.

It is an object of this invention to provide a method for removing soda from alumina, and it is a particular object of this invention to provide an economical and effective method of treating alumina with acid to remove soda from it. It is a further object of this invention to provide a method of treating alumina with acids which makes it possible to remove soda from the alumina to any desired extent, including substantially complete removal of the soda.

In accordance with this invention, alumina containing soda is leached with a solution containing hydrofluoric acid and another acid. Hydrochloric acid, sulfuric acid, nitric acid, chloric acid, boric acid, oxalic acid, and acetic acid are preferred as the additional acid. These latter acids dissolve double fluoride salts of sodium and aluminum, such as sodium cryolite or chiolite, and it may be that in leaching the alumina with a mixture of hydrofluoric acid and one of these acids, the hydrofluoric acid reacts with soda and alumina values to form such a double salt, and that the second acid dissolves that salt. Instead of using a solution of hydrofluoric acid and boric acid prepared by mixing the two acids as such, a fluoboric acid solution—which can be considered a solution of hydrofluoric and boric acids, regardless of its method of preparation—can be employed.

In general, the amount, concentration, and temperature of the leaching solution, as well as the duration of the leaching operation, are interrelated, and the condition desirable for optimum results with respect to any one of these factors depends to some extent on the particular conditions existing with respect to the other factors mentioned. For example, an increase in acid concentration makes it possible to obtain equivalent removal of soda in a shorter leaching time at the same temperature; and with an increase in the temperature of the leaching solution, the concentration of acid required to reduce the soda content to a particular level in a given time is lowered.

The leaching solution may be allowed to stand in contact with the alumina, with or without agitation, or it may be circulated through the alumina. As to the acid concentration in the leaching solution, satisfactory results can be obtained readily with solutions whose total acid concentration is as low as 5 per cent by weight, though higher concentrations of acid are usually preferable because with such concentrations the soda is removed more rapidly, other conditions being the same. Ordinarily a total acid concentration of 10 to 40 per cent by weight is preferred. The relative amounts of hydrofluoric acid and the additional acid are not critical in the sense that any particular ratio must exist between the acids, but ordinarily best results are obtained by using approximately equal molecular amounts of each acid in the leaching solution.

It is desirable that the leaching solution be used hot, and a temperature of at least 150° F. is preferable. The duration of the leaching operation may vary, depending on the particular conditions of operation and the extent to which it is desired to eliminate soda from the alumina, but it is usually sufficient to leach the alumina for from ½ to 3 hours. If the soda content is not lowered to the desired extent by a single leaching operation under the conditions described above, it can be further lowered by additional leaching in accordance with procedures described.

After the leaching operation, the acid solution is separated from the alumina by filtering or the like, and can be re-used in treating additional alumina, the sodium values being removed from the solution by well-known methods when they have accumulated to such an extent as to impair the efficiency of the solution. After separation of the alumina and the acid solution, the alumina is preferably washed with water to remove residual acid and soluble impurities left therein by the leaching operation.

This invention is applicable to both anhydrous alumina and alumina having free or chemically combined water associated with it. Consequently, the term "alumina" is used herein to refer to anhydrous alumina and hydrated or hydrous forms of alumina, such as aluminum trihydrate and gelatinous alumina. Preferably, however, the alumina is anhydrous or of low water content.

The following examples illustrate the operation of the invention.

Example 1

Alumina produced by auto-precipitation of aluminum trihydrate from a sodium aluminate solution by the well known Bayer process, followed by calcination of the aluminum trihydrate, and containing 0.68 per cent by weight of sodium values, calculated as soda ($Na_2O$), was allowed to stand for 1½ hours in contact with about an equal weight of a 6N solution containing equal amounts of hydrofluoric acid and hydrochrolic acid by weight, the solution being maintained at 180° F. The leaching solution was then drained off, and the alumina was washed thoroughly with water and dried. The alumina was then found to contain 0.02 per cent by weight of soda.

Example 2

Alumina produced as described in the preceding example and containing 0.68 per cent by weight of soda was allowed to stand for 1½ hours in contact with an equal weight of 3N fluoboric acid solution at 180° F. When washed and dried, the alumina contained 0.15 per cent by weight of soda. The alumina was then leached again for 1½ hours with an equal weight of 3N fluoboric acid solution at 180° F. and when washed with water and dried it contained 0.02 per cent by weight of soda.

I claim:

1. The method of removing soda from alumina precipitated from a solution containing a dissolved sodium compound comprising leaching the alumina with a solution containing hydrofluoric acid and another acid.

2. The method of removing soda from alumina precipitated from a solution containing a dissolved sodium compound comprising leaching the alumina with a solution of fluoboric acid.

3. The method of removing soda from alumina precipitated from a solution containing a dissolved sodium compound comprising leaching the alumina with a solution containing at least 2½ per cent by weight of hydrofluoric acid and at least 2½ per cent by weight of another acid.

4. The method of removing soda from alumina precipitated from a solution containing a dissolved sodium compound comprising leaching the alumina with a fluoboric acid solution containing at least 5 per cent by weight of fluoboric acid.

5. The method of removing soda from alumina precipitated from a solution containing a dissolved sodium compound comprising leaching the alumina with a solution containing hydrofluoric acid and another acid, said acids constituting from 5 to 40 per cent by weight of said solution.

6. The method of removing soda from alumina precipitated from a solution containing a dissolved sodium compound comprising leaching the alumina with a solution containing hydrofluoric acid and another acid, said second mentioned acid in solution being capable of dissolving double fluoride salts of sodium and aluminum.

7. The method of removing soda from alumina precipitated from a solution containing a dissolved sodium compound comprising leaching the alumina with a solution containing hydrofluoric acid and another acid, and thereafter washing the alumina with water.

AUGUST H. RIESMEYER.